US012659764B2

(12) United States Patent
Kordybach et al.

(10) Patent No.: US 12,659,764 B2
(45) Date of Patent: Jun. 16, 2026

(54) AVOIDING CHO CANCELLATION OR RE-INITIALISATION IN CASE OF SCG RECONFIGURATION

(71) Applicant: Nokia Technologies Oy, Espoo (FI)

(72) Inventors: Krzysztof Kordybach, Wrocław (PL); Frederic Ratovelomanana, Paris (FR); Halit Murat Gürsu, Munich (DE); Ahmad Awada, Munich (DE); Jean-Michel Pugeat, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 498 days.

(21) Appl. No.: 18/111,050

(22) Filed: Feb. 17, 2023

(65) Prior Publication Data

US 2024/0284198 A1 Aug. 22, 2024

(51) Int. Cl.
*H04W 24/02* (2009.01)
*H04W 36/00* (2009.01)

(52) U.S. Cl.
CPC ..... *H04W 24/02* (2013.01); *H04W 36/00835* (2018.08)

(58) Field of Classification Search
CPC ........... H04W 24/02; H04W 36/00835; H04W 36/362; H04W 36/0069
See application file for complete search history.

(56) References Cited

U.S. PATENT DOCUMENTS

| | | | |
|---|---|---|---|
| 2023/0370915 A1* | 11/2023 | Da Silva | H04W 36/0069 |
| 2023/0388871 A1* | 11/2023 | Guo | H04W 36/0069 |
| 2025/0126514 A1* | 4/2025 | Yan | H04W 28/0278 |

FOREIGN PATENT DOCUMENTS

WO 2020259836 A1 12/2020

OTHER PUBLICATIONS

Written Opinion of the International Searching Authority dated May 8, 2024, issued in corresponding International Application No. PCT/EP2024/053719, 9 pages.
International Search Report dated May 8, 2024, issued in corresponding International Application No. PCT/EP2024/053719, 4 pages.

(Continued)

*Primary Examiner* — Nizam U Ahmed
(74) *Attorney, Agent, or Firm* — Carter, DeLuca & Farrell LLP

(57) ABSTRACT

There is provided an apparatus that includes at least one processor and at least one memory storing instructions. The instructions, when executed by the at least one processor, cause the apparatus at least to, receive a list of features of radio resource control (RRC) configuration, where the list is provided by a target secondary node (target SN) of a conditional handover (CHO) procedure, and where the list indicates, for each feature of the list of features of RRC configuration, whether a change in the respective feature requires cancellation or re-initialization of CHO; and, during the CHO procedure, based on information regarding a secondary cell group (SCG) reconfiguration for a source secondary node (source SN), compare the information with the list to determine whether the SCG reconfiguration requires cancellation or re-initialization of the CHO procedure.

2 Claims, 8 Drawing Sheets

(56) References Cited

OTHER PUBLICATIONS

R3-210183, 3GPP TSG-RAN WG3 #111-e, Jan. 25-Feb. 4, 2021, ZTE: Discussion on CPA and CPC, 3GPP draft; Mobile Competence Centre; 650, Route Des Lucioles; F-06921 Sophia-Antipolis Cedex; France.

3GPP TS 37.340 V17.3.0 (Dec. 2022) TSG-RAN; Evolved Universal Terrestrial Radio Access (E-UTRA) and NR; Multi-connectivity; Stage 2 (Release 17).

R3-230126 3GPP TSG-RAN WG3 Meeting #119, Feb. 27-Mar. 3, 2023, Krzysztof Kordybach et al: [TP to TS38423, CHO with NRDC] Data forwarding enhancements for CHO and SCG(s) kept at the target side.

R3-222821, 3GPP TSG-RAN3#115-e, Feb. 21-Mar. 3, 2022, Huawei, China Telecom, China Unicom, CATT, Intel Corporation, Google Inc., Support of CHO with SCG configuration: "NOTE 3b: In CHO with SCG configuration, it is up to the target MN implementation to make sure that the CG-Config provided from the (target) SN can be used in all CHO preparations.".

R3-226231, 3GPP TSG-RAN3#118, Nov. 14-18, 2022, Ericsson, CHO with candidate SCG(s): Proposal 1: The source SN informs the MN whether the target CHO + MR-DC or CHO+CPC configuration needs to be updated, if there is a reconfiguration.

* cited by examiner

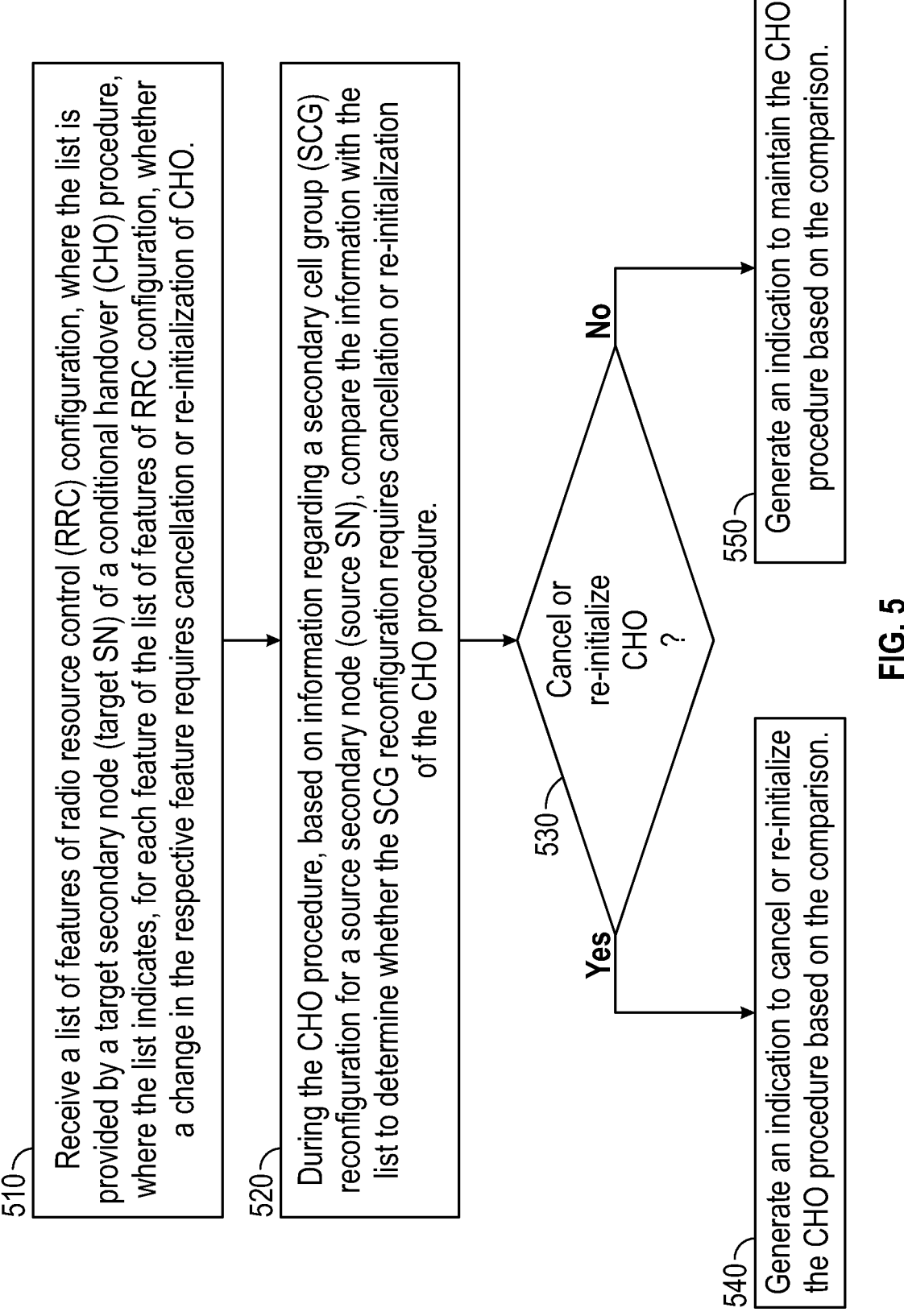

510 — Receive a list of features of radio resource control (RRC) configuration, where the list is provided by a target secondary node (target SN) of a conditional handover (CHO) procedure, where the list indicates, for each feature of the list of features of RRC configuration, whether a change in the respective feature requires cancellation or re-initialization of CHO.

520 — During the CHO procedure, based on information regarding a secondary cell group (SCG) reconfiguration for a source secondary node (source SN), compare the information with the list to determine whether the SCG reconfiguration requires cancellation or re-initialization of the CHO procedure.

530 — Cancel or re-initialize CHO ?

Yes

No

540 — Generate an indication to cancel or re-initialize the CHO procedure based on the comparison.

550 — Generate an indication to maintain the CHO procedure based on the comparison.

FIG. 5

AVOIDING CHO CANCELLATION OR RE-INITIALISATION IN CASE OF SCG RECONFIGURATION

FIELD

Various example embodiments relate generally to wireless networking and, more particularly, to conditional handover in dual connectivity wireless networking.

BACKGROUND

Wireless networking provides significant advantages for user mobility. A user's ability to remain connected while on the move provides advantages not only for the user, but also provides greater efficiency and productivity for society as a whole. As user expectations for connection reliability, data speed, and device battery life, become more demanding, technology for wireless networking must also keep pace with such expectations. Accordingly, there is continuing interest in improving wireless networking technology.

SUMMARY

In accordance with aspects of the disclosure, an apparatus includes at least one processor and at least one memory storing instructions. The instructions, when executed by the at least one processor, cause the apparatus at least to: receive a list of features of radio resource control (RRC) configuration, where the list is provided by a target secondary node (target SN) of a conditional handover (CHO) procedure, and where the list indicates, for each feature of the list of features of RRC configuration, whether a change in the respective feature requires cancellation or re-initialization of CHO. The instructions further cause the apparatus at least to: during the CHO procedure, based on information regarding a secondary cell group (SCG) reconfiguration for a source secondary node (source SN), compare the information with the list to determine whether the SCG reconfiguration requires cancellation or re-initialization of the CHO procedure.

In an aspect of the disclosed apparatus, comparing the information with the list may include: determining that a first feature is indicated in the list provided by the target SN as a feature which, if changed, requires cancellation or re-initialization of the CHO procedure, and determining that the first feature is indicated in the information as a feature that the SCG reconfiguration changes. The instructions, when executed by the at least one processor, may further cause the apparatus at least to: generate an indication to cancel or re-initialize the CHO procedure based on the comparison.

In an aspect of the disclosed apparatus, the indication may be a flag value. The instructions, when executed by the at least one processor, may further cause the apparatus at least to: transmit the flag value to a source master node (source MN) to cause the source MN to cancel or re-initialize the CHO procedure.

In an aspect of the disclosed apparatus, the instructions, when executed by the at least one processor, may further cause the apparatus at least to: cancel or re-initialize the CHO procedure.

In an aspect of the disclosed apparatus, comparing the information with the list may include, determining no overlap between: features indicated in the list provided by the target SN as features which, if changed, requires cancellation or re-initialization of the CHO procedure, and features indicated in the information as features that the SCG reconfiguration changes. The instructions, when executed by the at least one processor, may further cause the apparatus at least to: generate an indication to maintain the CHO procedure based on the comparison.

In an aspect of the disclosed apparatus, the list indicates, for each feature of the list of features of RRC configuration, whether a future SCG reconfiguration changing the respective feature requires cancellation or re-initialization of CHO.

In an aspect of the disclosed apparatus, the list may be implemented as a bitmap that maps bits to features of RRC configuration.

In an aspect of the disclosed apparatus, the information regarding the SCG reconfiguration may include a second list of features of RRC configuration, where the second list is provided by the source SN, and where the second list indicates, for each feature of the second list of features of RRC configuration, whether the SCG reconfiguration changes the respective feature.

In an aspect of the disclosed apparatus, the list and the second list may be implemented as bitmaps that map bits to features of RRC configuration, where the list and the second list have the same bitmap structure.

In accordance with aspects of the present disclosure, a processor-implemented method includes receiving a list of features of radio resource control (RRC) configuration, where the list is provided by a target secondary node (target SN) of a conditional handover (CHO) procedure, and where the list indicates, for each feature of the list of features of RRC configuration, whether a change in the respective feature requires cancellation or re-initialization of CHO. The processor-implemented method further includes: during the CHO procedure, based on information regarding a secondary cell group (SCG) reconfiguration for a source secondary node (source SN), comparing the information with the list to determine whether the SCG reconfiguration requires cancellation or re-initialization of the CHO procedure.

In an aspect of the disclosed processor-implemented method, comparing the information with the list may include: determining that a first feature is indicated in the list provided by the target SN as a feature which, if changed, requires cancellation or re-initialization of the CHO procedure, and determining that the first feature is indicated in the information as a feature that the SCG reconfiguration changes. The processor-implemented method may further include: generating an indication to cancel or re-initialize the CHO procedure based on the comparison.

In an aspect of the disclosed processor-implemented method, the indication may be a flag value. The processor-implemented method may further include: transmitting the flag value to a source master node (source MN) to cause the source MN to cancel or re-initialize the CHO procedure.

In an aspect of the disclosed processor-implemented method, the processor-implemented method may further include canceling or re-initializing the CHO procedure.

In an aspect of the disclosed processor-implemented method, comparing the information with the list may include, determining no overlap between: features indicated in the list provided by the target SN as features which, if changed, requires cancellation or re-initialization of the CHO procedure, and features indicated in the information as features that the SCG reconfiguration changes. The processor-implemented method may further include: generating an indication to maintain the CHO procedure based on the comparison.

In an aspect of the disclosed processor-implemented method, the list indicates, for each feature of the list of features of RRC configuration, whether a future SCG reconfiguration changing the respective feature requires cancellation or re-initialization of CHO.

In an aspect of the disclosed processor-implemented method, the list may be implemented as a bitmap that maps bits to features of RRC configuration.

In an aspect of the disclosed processor-implemented method, the information regarding the SCG reconfiguration may include a second list of features of RRC configuration, where the second list provided by the source SN, and where the second list indicates, for each feature of the second list of features of RRC configuration, whether the SCG reconfiguration changes the respective feature.

In an aspect of the disclosed processor-implemented method, the list and the second list may be implemented as bitmaps that map bits to features of RRC configuration, where the list and the second list have a same bitmap structure.

In accordance with aspects of the present disclosure, a processor-implemented method includes: initiating, by a source master node (source MN), a conditional handover (CHO) procedure; generating, by a target secondary node (target SN), a first list of features of radio resource control (RRC) configuration, where the first list indicates, for each feature of the first list of features of RRC configuration, whether a change in the respective feature requires cancellation or re-initialization of CHO; storing the first list at the source MN; generating, by a source secondary node (source SN), a second list of features of RRC configuration, where the second list indicates, for each feature of the second list of features of RRC configuration, whether a secondary cell group (SCG) reconfiguration for the source SN changes the respective feature; storing the second list at the source MN; and determining, by the source MN, whether to cancel or re-initialize the CHO procedure based on comparing, by the source MN, the stored first list and the stored second list.

In accordance with aspects of the present disclosure, a processor-implemented method includes: initiating, by a source master node (source MN), a conditional handover (CHO) procedure; generating, by a target secondary node (target SN), a list of features of radio resource control (RRC) configuration, where the list indicates, for each feature of the first list of features of RRC configuration, whether a change in the respective feature requires cancellation or re-initialization of CHO; storing the list at a source secondary node (source SN); generating, by the source SN, information regarding a secondary cell group (SCG) reconfiguration for the source SN, where the information indicates features of RRC configuration that the SCG reconfiguration changes; generating, by the source SN, an indication of whether the CHO procedure should be canceled or re-initialized by the source MN based on comparing, by the source SN, the stored list and the information; and re-initializing or maintaining the CHO procedure, by the source MN, based on the indication generated by the source SN.

According to some aspects, there is provided the subject matter of the independent claims. Some further aspects are defined in the dependent claims.

BRIEF DESCRIPTION OF THE DRAWINGS

Some example embodiments will now be described with reference to the accompanying drawings.

FIG. 5 is a diagram of an example operation of a network node apparatus; and

DETAILED DESCRIPTION

In the following description, certain specific details are set forth in order to provide a thorough understanding of disclosed aspects. However, one skilled in the relevant art will recognize that aspects may be practiced without one or more of these specific details or with other methods, components, materials, etc. In other instances, well-known structures associated with transmitters, receivers, or transceivers have not been shown or described in detail to avoid unnecessarily obscuring descriptions of the aspects.

Reference throughout this specification to "one aspect" or "an aspect" means that a particular feature, structure, or characteristic described in connection with the aspect is included in at least one aspect. Thus, the appearances of the phrases "in one aspect" or "in an aspect" in various places throughout this specification are not necessarily all referring to the same aspect. Furthermore, the particular features, structures, or characteristics may be combined in any suitable manner in one or more aspects.

Embodiments described in the present disclosure may be implemented in wireless networking apparatuses, such as, without limitation, apparatuses utilizing Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, enhanced LTE (eLTE), 5G New Radio (5G NR), and 802.11ax (Wi-Fi 6), among other wireless networking systems. The term 'eLTE' here denotes the LTE evolution that connects to a 5G core. LTE is also known as evolved UMTS terrestrial radio access (EUTRA) or as evolved UMTS terrestrial radio access network (EUTRAN).

Aspects of the present disclosure relate to conditional handover in dual connectivity scenarios. Aspects of the present disclosure provide various advantages, including avoiding, in various scenarios, cancellation or re-initialization of a conditional handover initiated by a master node in the case of a secondary cell group reconfiguration.

Figure 1:
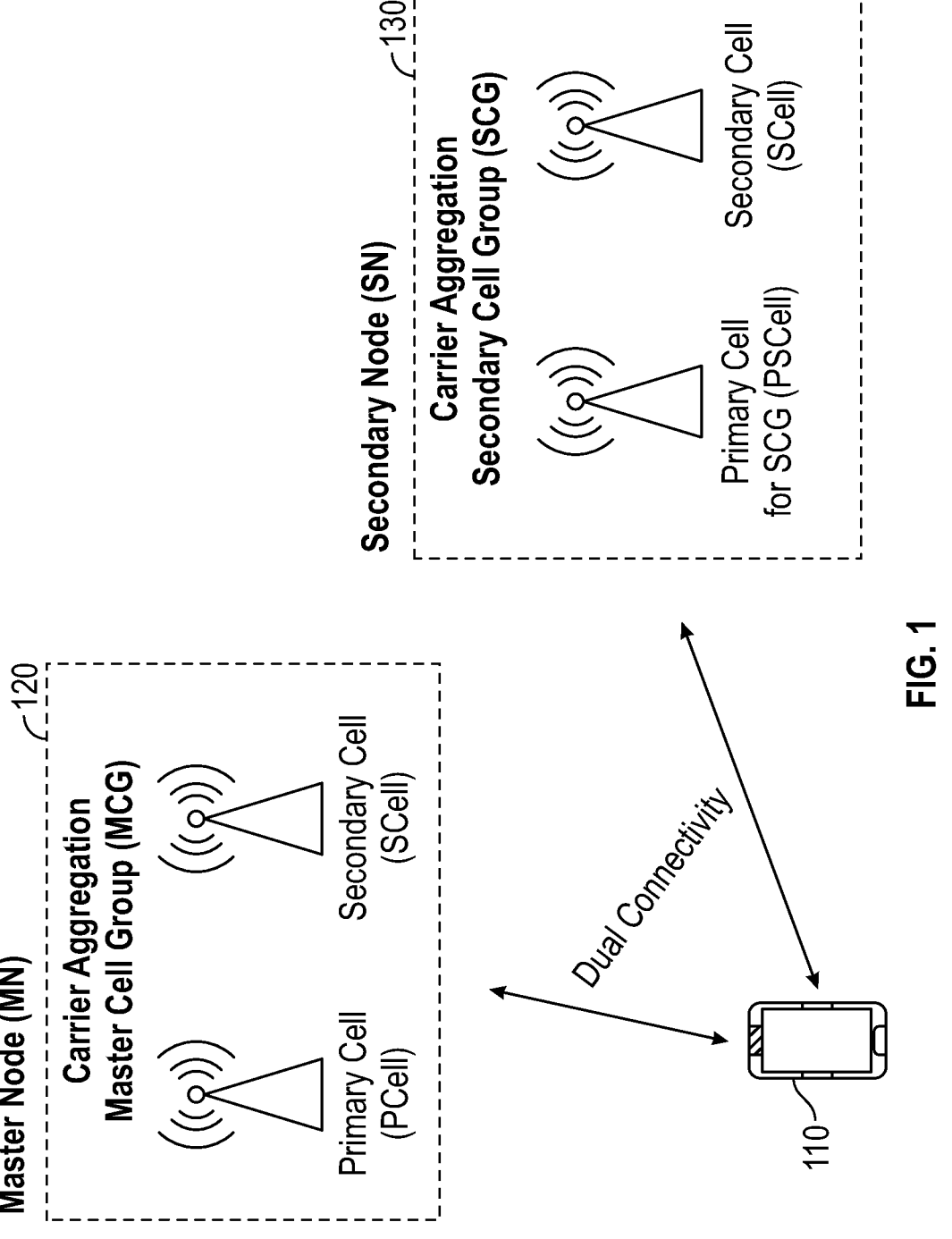
FIG. 1 is a diagram of an example embodiment of dual connectivity (DC) of a user equipment apparatus (UE) with a master node (MN) and a secondary node (SN), according to one illustrated aspect of the disclosure.

FIG. 1 is a diagram depicting an example of dual connectivity (DC) of a user equipment apparatus (UE) 110 with a master node (MN) 120 and a secondary node (SN) 130. The UE 110 may include, but is not limited to, a smartphone, a tablet, portable computers, vehicle-mounted wireless terminal devices, an Internet of Things (IoT) device, and/or a watch or other wearable device, among others. Dual connectivity allows a UE 110 to simultaneously connect to two network nodes. In embodiments, the MN 120 and/or the SN 130 may be a 5G New Radio (NR) node (e.g., gNB) or an LTE network node (e.g., eNB), among other types of nodes. In embodiments, the MN 120 and/or SN 130 may be base stations.

In embodiments, the MN 120 connects to a core network, such as a 5G core (5GC), and provides a control plane connection between a UE 110 and the core network, while the SN 130 connects to the MN 120 (e.g., via an Xn interface) and provides additional resources for user plane traffic. In embodiments, the MN 120 handles signaling messages, such as radio resource control (RRC) signaling messages. In embodiments, using signaling radio bearers (SRB) for LTE networks (e.g., SRB0, SRB1, and/or SRB2) and/or for 5G NR networks (e.g., SRB3), the SN 130 may handle signaling messages, such as RRC signaling messages, as well. As persons skilled in the art will understand, RRC is used by a node and a UE for various radio resource operations, such as, without limitation, connection management and mobility functions, among others. As used herein, the term "resource" may refer to radio resources, such as a physical resource block (PRB), a radio frame, a subframe, a time slot, a sub-band, a frequency region, a sub-carrier, a beam, etc. As used herein, the term "transmission" and/or "reception" may refer to, respectively, wirelessly transmitting and/or receiving via a wireless propagation channel on radio resources. Persons skilled in the art will understand RRC and SRB.

Carrier aggregation may be used in conjunction with dual connectivity. Carrier aggregation enables a UE 110 to simultaneously connect with multiple cells so as to operate at multiple frequencies at the same time. In embodiments, the multiple cells may be located at a single base station and/or at a common location (e.g., small cells or femtocells at a facility). One or more cells that may be usable by a UE under carrier aggregation may be referred to as a "cell group." When carrier aggregation is used with dual connectivity, the master node and/or the secondary node may have a cell group. A cell group of a master node may be referred to as a master cell group (MCG), and a cell group of a secondary node may be referred to as a secondary cell group (SCG). As shown in FIG. 1, the MCG includes a primary cell (PCell) and may include one or more secondary cells (SCell). The SCG includes a primary cell of a secondary cell group (PSCell) and may include one or more secondary cells (SCell). Persons skilled in the art will understand the characteristics and functions of such cells and cell groups.

In radio communications, a node may be implemented, at least partly, by a centralized unit, CU, (e.g., server or host) that is operationally coupled to one or more distributed units, DU, (e.g., a radio head). In embodiments, it is possible that node operations may be distributed among multiple centralized units (e.g., servers or hosts). In embodiments, a network node in 5G wireless networking may be implemented based on a so-called CU-DU split. In embodiments, a processing task may be performed in either the CU or the DU, and the shifting of responsibility between the CU and the DU may be configurable according to a particular implementation.

The example of FIG. 1 is merely illustrative. Other arrangements different from FIG. 1 are contemplated to be within the scope of the present disclosure.

Figure 2:
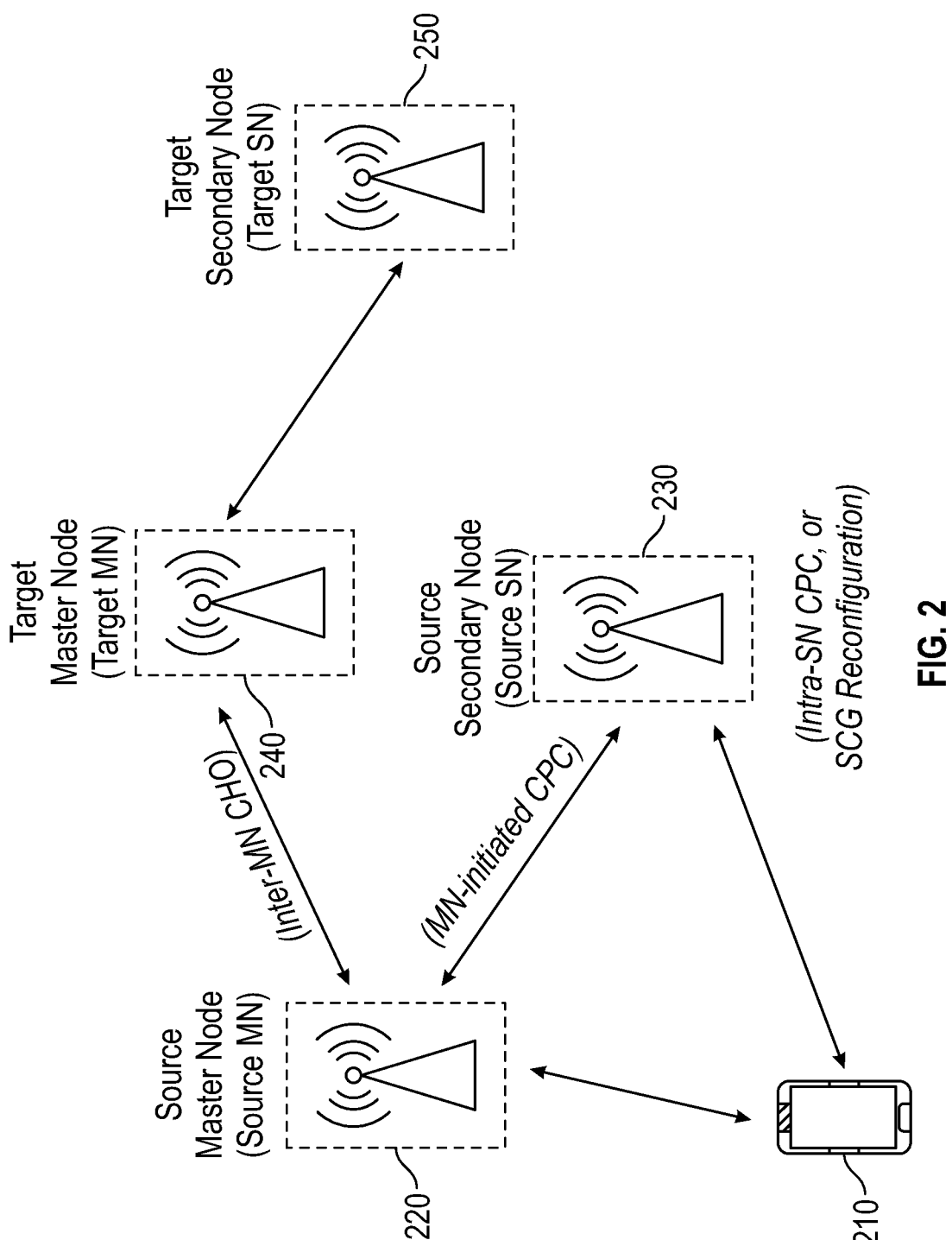
FIG. 2 is a diagram of an example embodiment of a conditional handover (CHO) procedure involving dual connectivity (DC), according to one illustrated aspect of the disclosure.

FIG. 2 depicts an example of a conditional handover procedure involving dual connectivity (DC). Handover (HO) refers to a procedure that transitions the servicing of a UE from a source node or cell to a target node or cell. HO may be performed, for example, when a UE transits between cells, among other scenarios. FIG. 2 shows a UE 110, a source MN 220, a source SN 230, a target MN 240, and a target SN 250.

The standards of 5G 3GPP (3rd Generation Partnership Project) Release 16 enable conditional handover (CHO) operations. CHO is a process that allows a source node to define one or more execution conditions for a HO, and subsequently, allows a UE to execute the HO when the execution conditions are met. In the case of dual connectivity, and with reference to FIG. 2, a CHO may involve a handover from a source MN 220 to a target MN 240, a handover from a source SN 230 to a target SN 250, and/or a change of PSCell within a SN. The PSCell change, when done in a conditional manner, is referred to as a Conditional PSCell Change (CPC). For clarity, a CHO from a source MN 220 to a target MN 240 may be referred herein to as an inter-MN CHO, a conditional PSCell change from a source SN 230 to a target SN 250 may be referred to herein as an inter-SN CPC (whether MN-initiated or SN-initiated), and a CPC within a SN (e.g., within source SN 230) may be referred to herein as an intra-SN CPC. Specific standards that may be relevant include, without limitation, 3GPP TS 37.340 and TS 38.423.

Complications may occur in connection with a CHO in various scenarios. As persons skilled in the art will understand, when a CHO is initially triggered, a CHO target node or cell acknowledges and agrees to handle a UE configuration. As mentioned above, RRC is used by a node and a UE for various radio resource operations. A UE RRC reconfiguration, occurring between the triggering of CHO and handover execution, may lead to inconsistencies during the execution of the handover because the UE may have a different RRC configuration than that assumed by the target node or cell. As another example, in situations that use delta configurations (i.e., a configuration dependent on a base configuration), a change in the base configuration may render the delta configuration unusable.

The potential scenarios can be even more complex. The standards of 5G 3GPP Release 17 extend CHO procedures to dual connectivity scenarios where a target MN 240 is also set up with dual connectivity and extend CHO procedures so that CPC may be initiated by either a source MN 220 or a source SN 230. Since Release 17, it has become possible, in dual connectivity scenarios, for a source MN 220 to initiate inter-MN CHO or inter-SN CPC, at the same time that the source SN 230 initiates intra-SN CPC or inter-SN CPC.

In enabling all such functionalities related to inter-MN CHO, MN-initiated CPC (inter-SN or intra-SN), and SN-initiated CPC (inter-SN or intra-SN), mutual interactions among them can occur in a complicated manner. For example, in some cases, execution of CPC (or plain SCG reconfiguration) erases CHO configuration in the UE 110, which may affect a triggered inter-MN CHO. In other cases, execution of CPC (or plain SCG reconfiguration) does not erase CHO configuration in the UE 110, but an executed CPC may still change the base configuration of the SCG configuration and create possible problems for an already prepared delta configuration, if such is used by a target MN 240 or target SN 250. In the case of delta configurations, it is possible that any change of SCG base configuration in a UE 110 may result in cancelling existing CHO (e.g., inter-MN CHO and/or MN-initiated CPC) and possibly re-initializing it using the new SCG configuration in the UE 110. However, in some cases, modifications of SCG configuration in a UE 110 do not affect a delta SCG configuration created at a target SN 250.

In aspects, the present disclosure identifies circumstances when a SCG reconfiguration does not require cancelling or re-initializing of an inter-MN CHO and/or of a MN-initiated CPC. In aspects, the present disclosure addresses avoiding inter-MN CHO cancellation or re-initialization (and in embodiments, avoiding cancellation or re-initialization of MN-initiated CPC) in case of SCG reconfiguration.

Aspects of the present disclosure apply a list of features of an RRC configuration, which informs a source MN 220 and/or a source SN 230 of changes that are allowed to be done in the SCG configuration without affecting a prepared inter-MN CHO or MN-initiated CPC. In embodiments, the list of features of the RRC configuration may be implemented as a map of bits (e.g., bits in a signal or message) to RRC features and may be referred to herein as a "bitmap" or "feature bitmap." As explained in more detail below in connection with FIGS. 3 and 4, the bits of a bitmap may mean different things depending on how it is used. For ease of description, the paragraphs below may include descriptions using bitmaps, but it is intended that all such descriptions shall apply to a list of features of an RRC configuration, implemented in any manner. Thus, any description referring to a bitmap shall be treated as though such description refers to a list of features of an RRC configuration (implemented in any manner), as well.

The example depicted in FIG. 2 is merely illustrative. Variations are contemplated to be within the scope of the present disclosure.

Figure 3A:
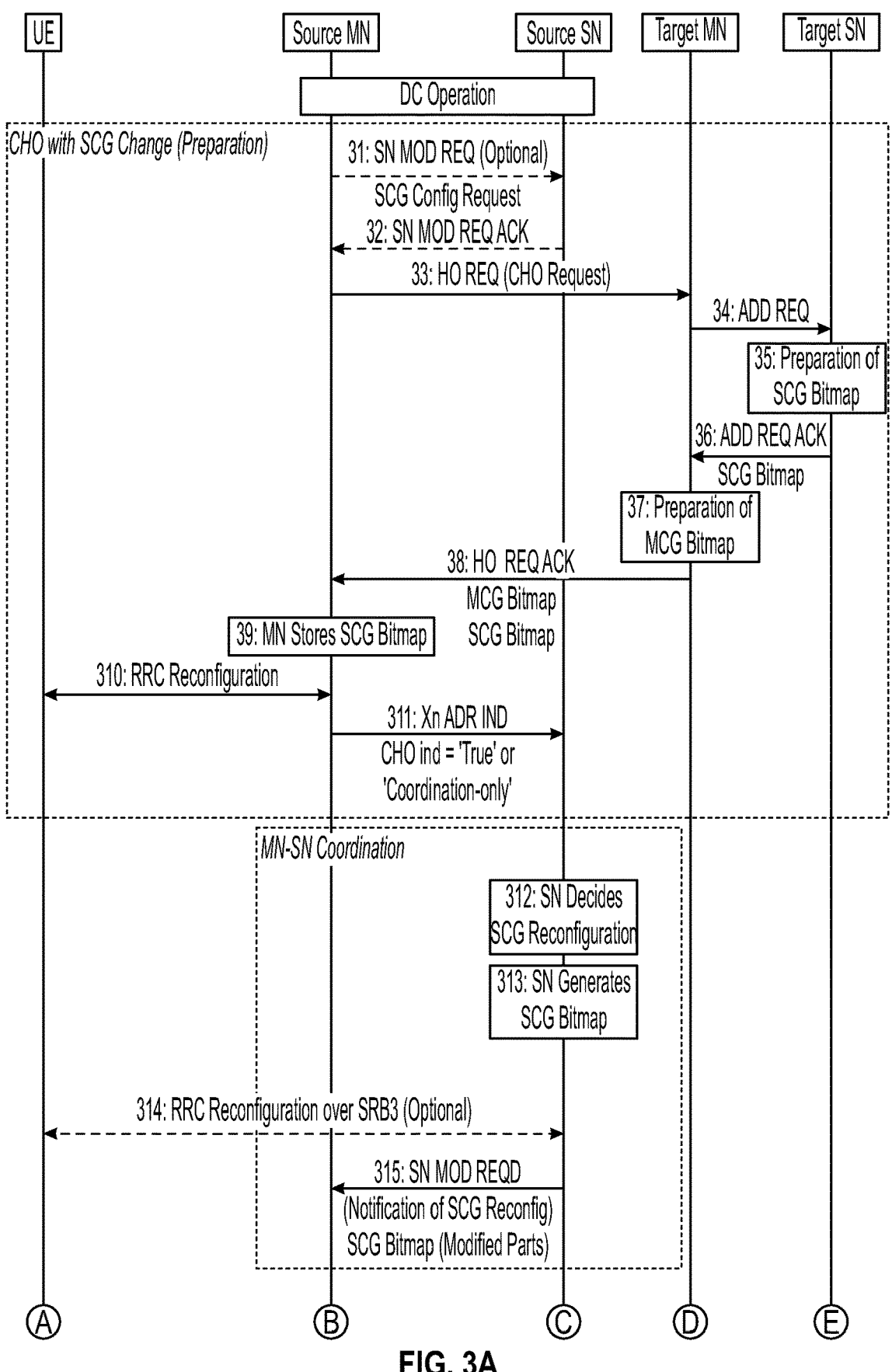
FIGS. 3A and 3B are diagrams of an example embodiment of signals and operations among a UE, a source MN, a source SN, a target MN, and a target SN, according to one illustrated aspect of the disclosure.
Figure 3B:
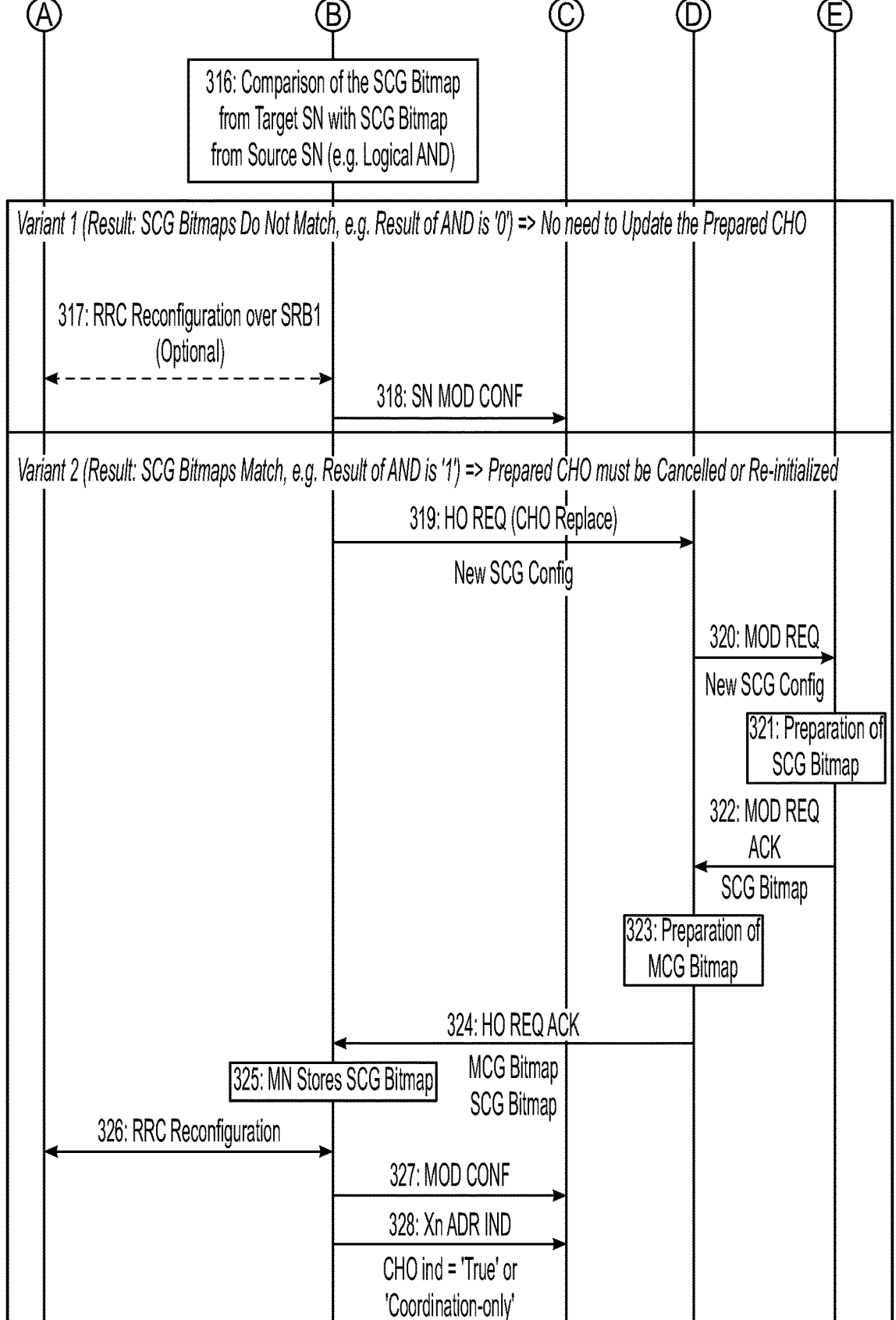
Figure 4A:
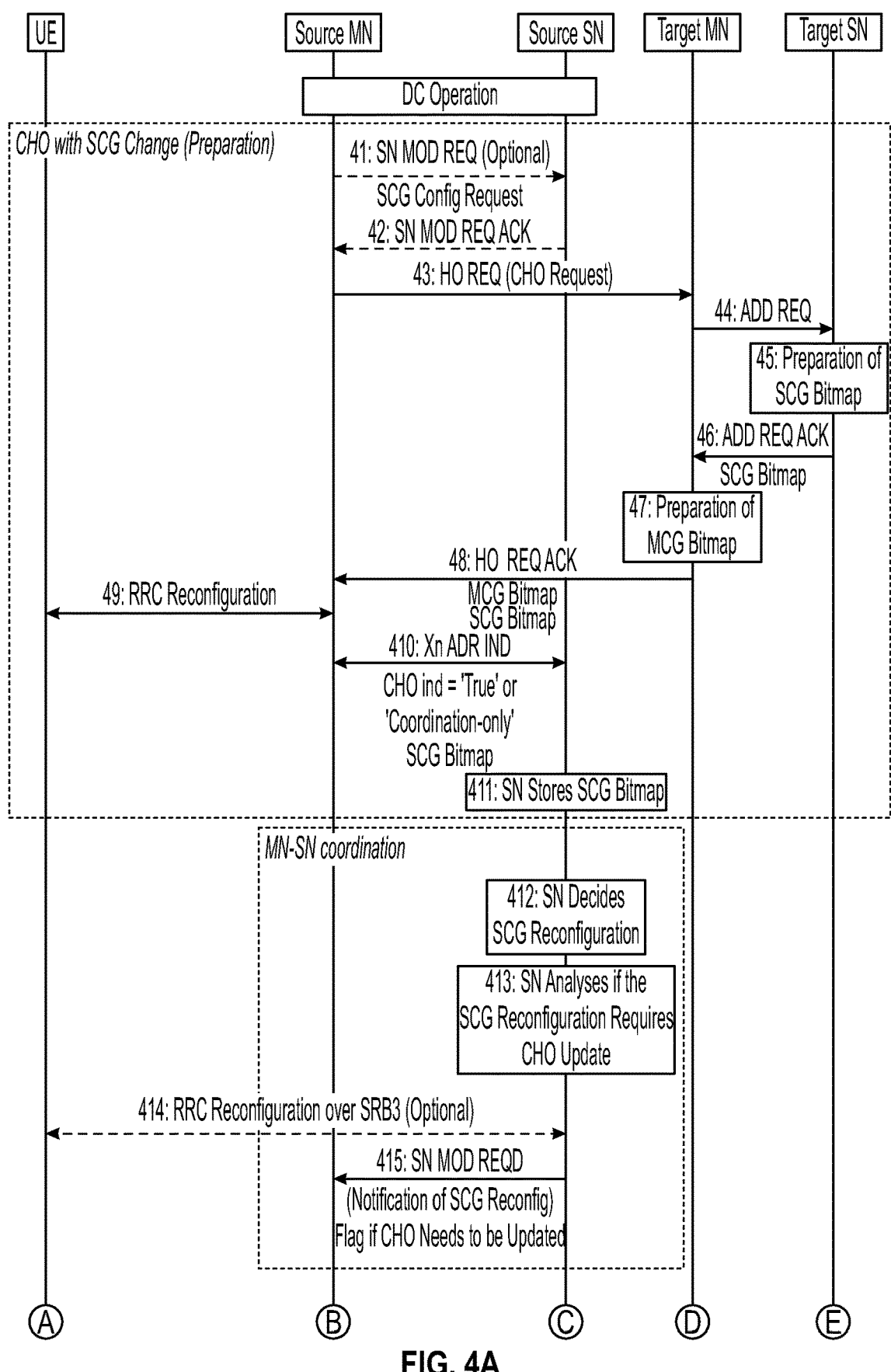
FIGS. 4A and 4B are diagrams of another example embodiment of signals and operations among a UE, a source MN, a source SN, a target MN, and a target SN, according to one illustrated aspect of the disclosure.
Figure 4B:
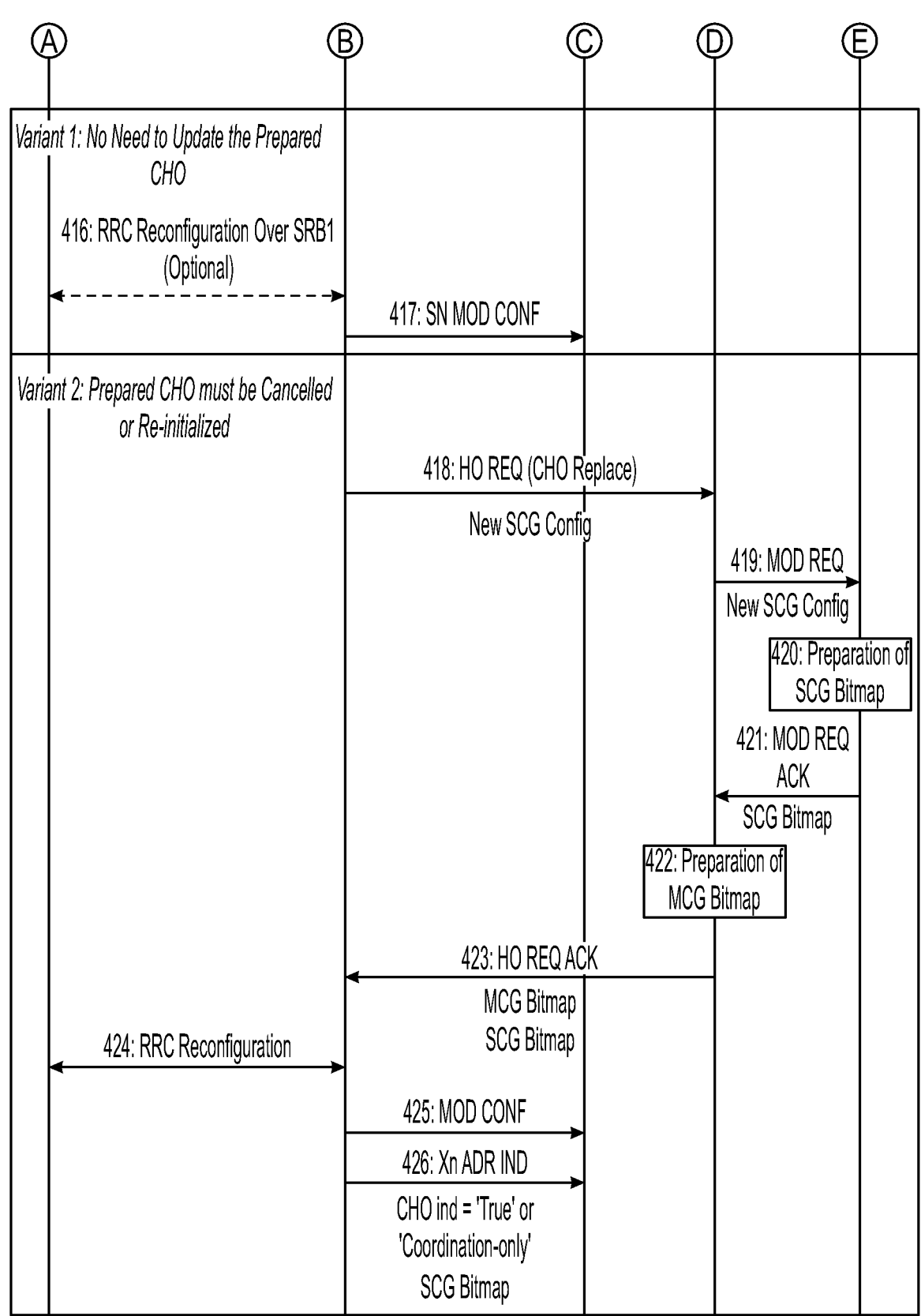

FIGS. 3A/3B and FIGS. 4A/4B are diagrams of example signals and operations among a UE, a source MN, a source SN, a target MN, and a target SN, in connection with embodiments of a CHO operation (e.g., inter-MN CHO or MN-initiated CPC). Both FIGS. 3A/3B and FIGS. 4A/4B provide embodiments of a mechanism for determining whether SCG reconfiguration at the source SN would require the source MN to cancel or re-initialize a CHO request.

One or more of the following operations may be implemented in connection with the CHO operations of the present disclosure, such as the examples shown in FIGS. 3A/3B and FIGS. 4A/4B. Referring also to FIG. 2:

The source MN 220 controls an inter-MN CHO and/or an MN-initiated CPC, and the source MN 220 decides whether such is to be cancelled or re-initialized.

As long as the inter-MN CHO or MN-initiated CPC is not executed, the source SN 230 controls the SCG configuration in the UE.

The SCG configuration to be used after inter-MN CHO or MN-initiated CPC execution is controlled by the target SN 250, which defines a delta SCG configuration and decides which parts of the base SCG configuration are to be replaced.

A MN 220, 240 is not required to decode or interpret SCG reconfiguration it receives from its SN 230, 250 or from the target node in a HO.

In aspects of the present disclosure, the embodiment of FIGS. 3A/3B implements a three-part approach. In part (1), the source MN stores a SCG bitmap received from the target SN (referred to as target SN SCG bitmap) in connection with a CHO request (e.g., e.g., inter-MN CHO or MN-initiated CPC). The target SN SCG bitmap indicates which features of RRC configuration, if changed, require CHO re-initialization or cancellation. In part (2), the source SN notifies the source MN about an executed SCG reconfiguration and includes a second bitmap (referred to as source SN SCG bitmap) in a SN MODIFICATION REQUIRED signal transmitted from the source SN to the source MN. The source SN SCG bitmap has the same structure as the target SN SCG bitmap received from the target SN. However, the source SN SCG bitmap indicates which features of RRC configuration are changed or are being changed. Thus, the source SN SCG bitmap informs the source MN what changes are about to be executed or have been executed. Part (3) provides a mechanism for determining when CHO cancellation or re-initialization is needed or is not needed. In part (3), the source MN compares the target SN SCG bitmap and the source SN SCG bitmap, received respectively by the source MN in parts (1) and (2). As noted above, the target SN SCG bitmap indicates which RRC configuration feature changes require CHO re-initialization or cancellation, and the source SN SCG bitmap indicates which RRC configuration features are changed or are about to be changed. Thus, if a RRC configuration feature in the SCG bitmaps overlap, this indicates that a change executed by the source SN is a change that the target SN has indicated would require a CHO re-initialization or cancellation. Based on at least one of such an overlap in the SCG bitmaps, the source MN determines it must cancel or re-initialize an inter-MN CHO or a MN-initiated CPC. On the other hand, if the SCG bitmaps are exclusive, this indicates that no changes executed by the source SN are a change that the target SN has indicated would require a CHO re-initialization or cancellation. In that case, the source MN determines that any inter-MN CHO or MN-initiated CPC may remain as prepared.

The parts described above are implemented in the example CHO operation illustrated in FIGS. 3A/3B, in which the UE has dual connectivity with the source MN and the source SN. The signals and operations illustrated in FIGS. 3A/3B are merely examples, and variations are contemplated to be within the scope of the present disclosure. For example, additional signals and/or operations not shown in FIGS. 3A/3B may occur, and certain signals and/or operations shown in FIGS. 3A/3B may not occur or may occur in a different order.

Signals 31 and 32 are optional. For signal 31, the source MN transmits a SN modification request signal (SN MOD REQ) to the source SN. For signal 32, the source SN acknowledges by transmitting a SN MOD REQ ACK signal to the source MN.

For signal 33, the source MN transmits a CHO request signal (HO REQ) to the target MN. For signal 34, the target MN transmits a SN add request signal (ADD REQ) to the target SN. For operation 35, the target SN prepares the target SN SCG bitmap, which indicates which features of RRC configuration, if changed, require CHO re-initialization or cancellation. For signal 36. The target SN acknowledges the ADD REQ by transmitting the ADD REQ ACK signal to the target MN, with the target SN SCG bitmap included in the acknowledgement signal. Operation 37 is optional. For operation 37, the target MN prepares an MCG bitmap. For signal 38, the target MN acknowledges the HO REQ by transmitting a HO REQ ACK signal to the source MN, with the target SN SCG bitmap (and optionally the MCG bitmap) included in the acknowledgement signal.

For operation 39, the source MN stores the target SN SCG bitmap. For signal(s) 310, the UE and the source MN perform RRC reconfiguration. For signal 311, the source MN transmits an Xn address indication signal (Xn ADR IND) to the source SN. In the Xn ADR IND signal, the information element for CHO indication may be set to "true" or "coordination-only."

For operation 312, the source SN performs SCG reconfiguration or decides to perform SCG reconfiguration. For operation 313, the source SN generates a source SN SCG bitmap, which has the same structure as the target SN SCG bitmap and indicates which features of RRC configuration are changed or are being changed in the SCG reconfiguration. Signal(s) 314 are optional to signal 317. For signal(s) 314, the source SN and the UE may perform RRC reconfiguration in accordance with the SCG reconfiguration using SRB3. For signal 315, the source SN transmits a SN modification required signal (SN MOD REQD) to the source MN, with the source SN SCG bitmap included in the SN MOD REQD signal.

For operation 316, the source MN performs a comparison of the target SN SCG bitmap with the source SN SCG bitmap. The comparison may be implemented, for example, by a logical AND operation between the bitmaps.

As described above, if a RRC configuration feature in the SCG bitmaps overlap, the logical AND operation would result in a non-zero value, which indicates that a change executed by the source SN is a change that the target SN has indicated would require a CHO re-initialization or cancellation. As a result of such a determination, signals and operations 319-328 may be performed, in which the source MN re-initializes the CHO request. The signals and operations 319-326 and 328 are the same as signals and operations 33-311. For signal 327, the source MN transmits a SN modification confirmation signal (SN MOD CONF) to the source SN.

On the other hand, if the SCG bitmaps are exclusive, the logical AND would have a zero value, which indicates that no changes executed by the source SN are a change that the target SN has indicated would require a CHO re-initialization or cancellation. As a result of such determination, signals 317 and 318 may be performed, in which the source MN maintains the HO procedure as prepared. Signal(s) 317 are optional. For signal(s) 317, the source MN and the UE may perform RRC reconfiguration over SRB1. For signal 318, the source MN confirms the SN modification by transmitting the signal SN MOD CONF to the source SN.

As mentioned above, the signals and operations illustrated in FIGS. 3A/3B are merely examples, and variations are contemplated to be within the scope of the present disclosure. For example, the list of features of RRC configuration may not be implemented as bitmaps and may be implemented in another manner. Whichever way the list of features of RRC configuration is implemented, the source MN may compare the target SN list and the source SN list determine whether changes executed by the source SN are a change that the target SN has indicated would require a CHO re-initialization or cancellation. Such and other variations are contemplated to be within the scope of the present disclosure.

In aspects of the present disclosure, the embodiment of FIGS. 4A/4B implements another three-part approach. In part (1), the source MN receives a target SN SCG bitmap received from the target SN, in connection with a CHO request (e.g., e.g., inter-MN CHO or MN-initiated CPC), and forwards the target SN SCG bitmap to the source SN (e.g., in the Xn ADDRESS INDICATION). As with FIGS. 3A/3B, the target SN SCG bitmap indicates which features of RRC configuration, if changed, require CHO re-initialization or cancellation. The source SN stores the target SN SCG bitmap. In part (2), when the source SN decides to execute SCG reconfiguration or executes SCG reconfiguration, it compares changes or planned changes with the stored target SN SCG bitmap from the target SN. If any of the changes or planned changes are an RRC configuration feature indicated in the target SN SCG bitmap as requiring cancellation or re-initialization of the CHO, the source SN sets a value of a flag (e.g., flag value=1) to indicate that determination in a notification to the source MN. Otherwise, if no planned changes or changes executed by the source SN are a change that the target SN has indicated would require a CHO re-initialization or cancellation, the source SN may set the flag value to indicate that determination (e.g., flag value=0). In part (3), the source MN determines, based on the flag value received from the source SN, whether or not to cancel or re-initialize CHO.

The parts described above are implemented in the example CHO operation illustrated in FIGS. 4A/4B, in which the UE has dual connectivity with the source MN and the source SN. The signals and operations illustrated in FIGS. 4A/4B are merely examples, and variations are contemplated to be within the scope of the present disclosure. For example, additional signals and/or operations not shown in FIGS. 4A/4B may occur, and certain signals and/or operations shown in FIGS. 4A/4B may not occur or may occur in a different order.

In FIG. 4A, signals and operations 41-48 are the same as signals and operations 31-38 of FIG. 3A. In particular, the target SN prepares a target SN SCG bitmap.

For signal(s) 49, the UE and the source MN perform RRC reconfiguration. For signal 410, the source MN transmits an Xn address indication signal (Xn ADR IND) to the source SN, with the target SN SCG bitmap included in the signal. In the Xn ADR IND signal, the information element for CHO indication may be set to "true" or "coordination-only." For operation 411, the source SN stores the target SN SCG bitmap.

For operation 412, the source SN performs SCG reconfiguration or decides to perform SCG reconfiguration. For operation 413, the source SN compares changes or planned changes with the stored target SN SCG bitmap from the target SN. If any of the changes or planned changes are a RRC configuration feature indicated in the target SN SCG bitmap as requiring cancellation or re-initialization of the CHO, the source SN sets a flag value to indicate that determination (e.g., flag value=1). Otherwise, if no planned changes or changes executed by the source SN are a change that the target SN has indicated would require a CHO re-initialization or cancellation, the source SN sets the flag value to indicate that determination (e.g., flag value=0). Signal(s) 414 are optional to signal(s) 416. For signal(s) 414, the source SN and the UE may perform RRC reconfiguration in accordance with the SCG reconfiguration using SRB3. For signal 415, the source SN transmits a SN modification required signal (SN MOD REQD) to the source MN, with the flag value included in the SN MOD REQD signal.

As described above, the source MN determines, based on the flag value received from the source SN, whether or not to cancel or re-initialize CHO. The flag may have one value (e.g., flag value=1) which indicates that a change executed by the source SN is a change that the target SN has indicated would require a CHO re-initialization or cancellation. As a result of such flag value, signals and operations 418-426 may be performed, in which the source MN re-initializes the CHO request. The signals and operations 418-424 and 426 are the same as signals and operations 43-410. For signal 425, the source MN confirms the SN modification by transmitting the signal SN MOD CONF to the source SN.

On the other hand, if no planned changes or changes executed by the source SN are a change that the target SN has indicated would require a CHO re-initialization or cancellation, the source SN may set the flag value to indicate that determination (e.g., flag value=0). As a result of such determination, signals 416 and 417 may be performed, in which the source MN maintains the HO procedure as prepared. Signal(s) 416 are optional. For signal(s) 416, the source MN and the UE may perform RRC reconfiguration over SRB1. For signal 417, the source MN confirms the SN modification by transmitting the signal SN MOD CONF to the source SN.

As mentioned above, the signals and operations illustrated in FIGS. 4A/4B are merely examples, and variations are contemplated to be within the scope of the present disclosure. For example, the list of features of RRC configuration may not be implemented as bitmaps and may be implemented in another manner. Whichever way the list of features of RRC configuration is implemented, the source SN may compare its changes or planned changes with the target SN list to determine whether changes executed by the source SN are a change that the target SN has indicated would require a CHO re-initialization or cancellation. Such and other variations are contemplated to be within the scope of the present disclosure.

FIG. 5 is a diagram of an example operation of a network node apparatus, such as an apparatus of a source MN or a source SN. At block 510, the operation involves receiving a list of features of radio resource control (RRC) configuration, where the list is provided by a target secondary node (target SN) of a conditional handover (CHO) procedure, and where the list indicates, for each feature of the list of features of RRC configuration, whether a change in the respective feature requires cancellation or re-initialization of CHO. In case the network node apparatus is a source MN, the source MN receives the list, as in FIGS. 3A/3B. In case the network node apparatus is a source SN, the source SN receives the list, as in FIGS. 4A/4B.

At block 520, the operation involves, during the CHO procedure, based on information regarding a secondary cell group (SCG) reconfiguration for a source secondary node (source SN), comparing the information with the list to determine whether the SCG reconfiguration requires cancellation or re-initialization of the CHO procedure. In case the network node apparatus is a source MN, the information regarding the SCG reconfiguration may be a second list of features of RRC reconfiguration that would be changed by a SCG reconfiguration, as in FIGS. 3A/3B. Such a second list would be generated by the source SN and transmitted to the master MN for the master MN to compare the second list with the list from the target SN, as described in connection with FIGS. 3A/3B. In case the network node apparatus is the source SN, the information regarding the SCG reconfiguration may be information generated within the source SN relating to the SCG reconfiguration, as in FIGS. 4A/4B. The source SN would compare such information with the list from the target SN, as described in connection with FIGS. 4A/4B.

At block 530, the operation evaluates whether or not the determination at block 520 is to cancel or re-initialize CHO.

If the determination is to cancel or re-initialize CHO, the operation proceeds to block 540 to generate an indication to cancel or re-initialize the CHO procedure based on the comparison at block 520. In case the network node apparatus is the source MN, as in FIGS. 3A/3B, the indication may be a value internal to the source MN, such as a value resulting from the comparison at block 520. In case the network node apparatus is the source SN, as in FIGS. 4A/4B, the indication may be the flag value generated by the source SN.

If the determination is to not cancel or re-initialize CHO, the operation proceeds to block 550 to generate an indication to maintain the CHO procedure based on the comparison at block 520. In case the network node apparatus is the source MN, as in FIGS. 3A/3B, the indication may be a value internal to the source MN, such as a value resulting from the comparison at block 520. In case the network node apparatus is the source SN, as in FIGS. 4A/4B, the indication may be the flag value generated by the source SN.

The example operation shown in FIG. 5 is merely illustrative, and variations are contemplated to be within the scope of the present disclosure. In embodiments, other operations not shown in FIG. 5 may be performed by a source MN and/or a source SN, or by another network node apparatus.

Figure 6:
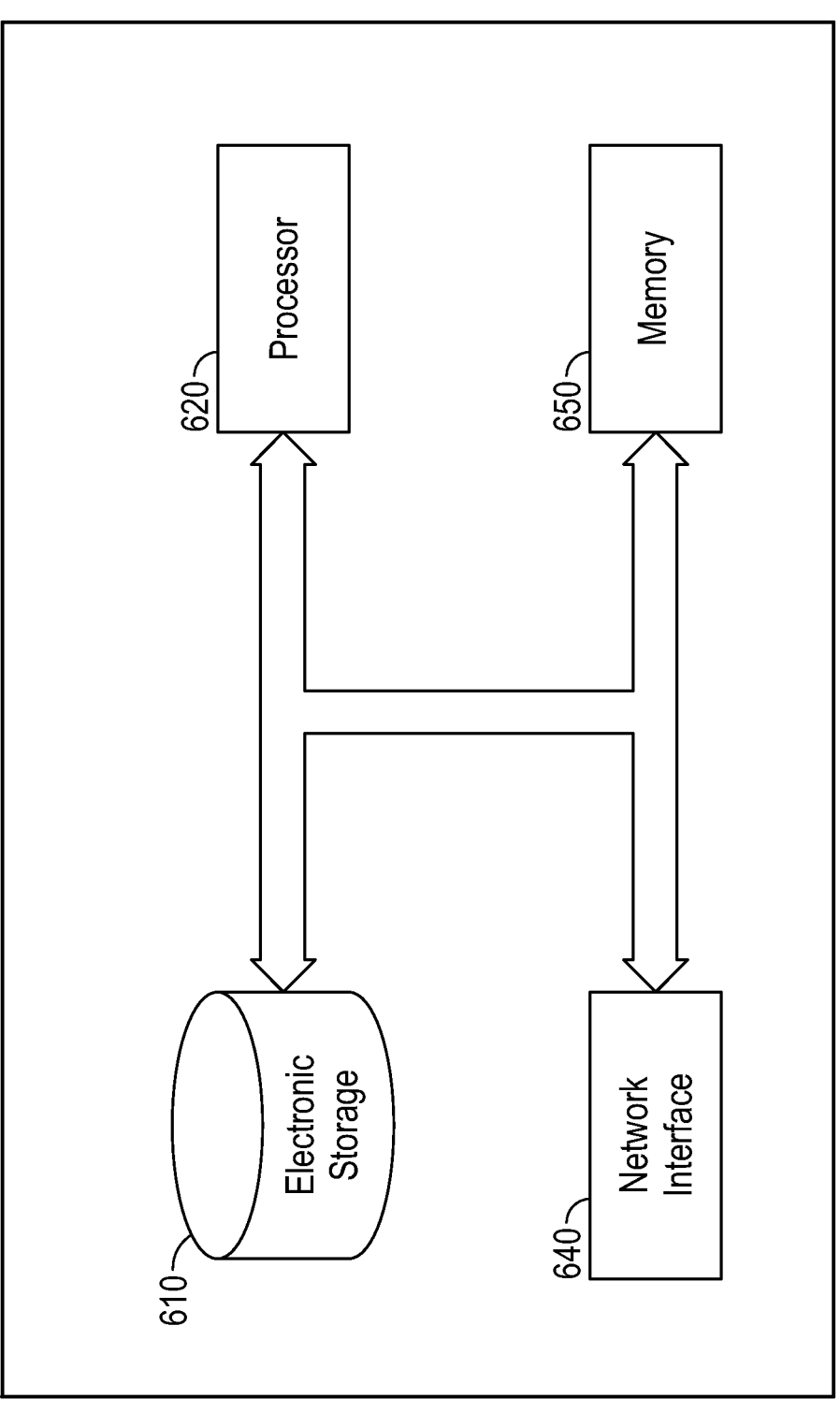
FIG. 6 is a diagram of an example embodiment of components of an apparatus, according to one illustrated aspect of the disclosure.

Referring now to FIG. 6, there is shown a block diagram of example components of a user equipment apparatus or a network node apparatus. The apparatus includes an electronic storage 610, a processor 620, a memory 650, and a network interface 640. The various components may be communicatively coupled with each other. The processor 620 may be and may include any type of processor, such as a single-core central processing unit (CPU), a multi-core CPU, a microprocessor, a digital signal processor (DSP), a System-on-Chip (SoC), or any other type of processor. The memory 650 may be a volatile type of memory, e.g., RAM, or a non-volatile type of memory, e.g., NAND flash memory. The memory 650 includes machine-readable instructions that are executable by the processor 520 to cause the apparatus to perform various operations, including the procedures mentioned above.

The electronic storage 610 may be and include any type of electronic storage used for storing data, such as hard disk drive, solid state drive, and/or optical disc, among other types of electronic storage. The electronic storage 610 stores software instructions for causing the apparatus to perform its operations and stores data associated with such operations, such as storing data relating to 5G NR standards, among other data. The network interface 640 may implement wireless networking technologies such as LTE, 5G NR, Wi-Fi 6, and/or other wireless networking technologies The components shown in FIG. 6 are merely examples, and persons skilled in the art will understand that an apparatus includes other components not illustrated and may include multiples of any of the illustrated components. Such and other embodiments are contemplated to be within the scope of the present disclosure.

Further embodiments of the present disclosure include the following examples.

Example 1. An apparatus comprising:
means for receiving a list of features of radio resource control (RRC) configuration, the list provided by a target secondary node (target SN) of a conditional handover (CHO) procedure, wherein the list indicates, for each feature of the list of features of RRC configuration, whether a change in the respective feature requires cancellation or re-initialization of CHO; and
means for, during the CHO procedure, based on information regarding a secondary cell group (SCG) reconfiguration for a source secondary node (source SN), comparing the information with the list to determine whether the SCG reconfiguration requires cancellation or re-initialization of the CHO procedure.
Example 2. The apparatus of Example 1, wherein comparing the information with the list comprises:
determining that a first feature is indicated in the list provided by the target SN as a feature which, if changed, requires cancellation or re-initialization of the CHO procedure, and determining that the first feature is indicated in the information as a feature that the SCG reconfiguration changes, the apparatus further comprising: means for generating an indication to cancel or re-initialize the CHO procedure based on the comparison.

Example 3. The apparatus of Example 2, wherein the indication is a flag value, the apparatus further comprising: means for transmitting the flag value to a source master node (source MN) to cause the source MN to cancel or re-initialize the CHO procedure.

Example 4. The apparatus of any one of the preceding Examples, the apparatus further comprising: means for canceling or re-initializing the CHO procedure.

Example 5. The apparatus of either Example 1 or Example 4, wherein comparing the information with the list comprises:

determining no overlap between:

features indicated in the list provided by the target SN as features which, if changed, requires cancellation or re-initialization of the CHO procedure, and features indicated in the information as features that the SCG reconfiguration changes, the apparatus further comprising: means for generating an indication to maintain the CHO procedure based on the comparison.

Example 6. The apparatus of any one of the preceding Examples, wherein the list indicates, for each feature of the list of features of RRC configuration, whether a future SCG reconfiguration changing the respective feature requires cancellation or re-initialization of CHO.

Example 7. The apparatus of any one of the preceding Examples, wherein the list is implemented as a bitmap that maps bits to features of RRC configuration.

Example 8. The apparatus of any one of the preceding Examples, wherein the information regarding the SCG reconfiguration comprises a second list of features of RRC configuration, the second list provided by the source SN, wherein the second list indicates, for each feature of the second list of features of RRC configuration, whether the SCG reconfiguration changes the respective feature.

Example 9. The apparatus of Example 8, wherein the list and the second list are implemented as bitmaps that map bits to features of RRC configuration, the list and the second list having a same bitmap structure.

Example 10. A processor-implemented method comprising:

receiving a list of features of radio resource control (RRC) configuration, the list provided by a target secondary node (target SN) of a conditional handover (CHO) procedure, wherein the list indicates, for each feature of the list of features of RRC configuration, whether a change in the respective feature requires cancellation or re-initialization of CHO; and during the CHO procedure: based on information regarding a secondary cell group (SCG) reconfiguration for a source secondary node (source SN), comparing the information with the list to determine whether the SCG reconfiguration requires cancellation or re-initialization of the CHO procedure.

Example 11. The processor-implemented method of Example 10, wherein comparing the information with the list comprises:

determining that a first feature is indicated in the list provided by the target SN as a feature which, if changed, requires cancellation or re-initialization of the CHO procedure, and determining that the first feature is indicated in the information as a feature that the SCG reconfiguration changes, the processor-implemented method further comprising:

generating an indication to cancel or re-initialize the CHO procedure based on the comparison.

Example 12. The processor-implemented method of either Example 10 or Example 11, wherein the indication is a flag value, the processor-implemented method further comprising:

transmitting the flag value to a source master node (source MN) to cause the source MN to cancel or re-initialize the CHO procedure.

Example 13. The processor-implemented method of any one of Examples 10-12, further comprising canceling or re-initializing the CHO procedure.

Example 14. The processor-implemented method of Example 10 or Example 13, wherein comparing the information with the list comprises:

determining no overlap between:

features indicated in the list provided by the target SN as features which, if changed, requires cancellation or re-initialization of the CHO procedure, and features indicated in the information as features that the SCG reconfiguration changes, the processor-implemented method further comprising:

generating an indication to maintain the CHO procedure based on the comparison.

Example 15. The processor-implemented method of any one of Examples 10-14, wherein the list indicates, for each feature of the list of features of RRC configuration, whether a future SCG reconfiguration changing the respective feature requires cancellation or re-initialization of CHO.

Example 16. The processor-implemented method of any one of Examples 10-15, wherein the list is implemented as a bitmap that maps bits to features of RRC configuration.

Example 17. The processor-implemented method of any one of Examples 10-16, wherein the information regarding the SCG reconfiguration comprises a second list of features of RRC configuration, the second list provided by the source SN, wherein the second list indicates, for each feature of the second list of features of RRC configuration, whether the SCG reconfiguration changes the respective feature.

Example 18. The processor-implemented method of Example 17, wherein the list and the second list are implemented as bitmaps that map bits to features of RRC configuration, the list and the second list having a same bitmap structure.

The embodiments and aspects disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different aspects in accordance with this disclosure. The phrase "a plurality of" may refer to two or more.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

While aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. An apparatus of a source master node (source MN) or a source secondary node (source SN), the apparatus comprising:

at least one processor; and at least one memory storing instructions which, when executed by the at least one processor, cause the apparatus of the source MN at least to:

receive, from a target secondary node (target SN) of a MN-initiated CPC (master node-initiated conditional primary cell of a SCG change) procedure, a target SN secondary cell group (SCG) bitmap, wherein the target SN SCG bitmap indicates, for each feature of a list of features of radio resource control (RRC) configuration, whether a future SCG reconfiguration change in the respective feature requires cancellation or re-initialization of the MN-initiated CPC procedure;

receive, from a target master node (target MN), a master cell group (MCG) bitmap:

receive, from a source secondary node (source SN), a SN MODIFICATION REQUIRED signal comprising:

a notification of an executed SCG reconfiguration, and a source SN SCG bitmap, the source SN SCG bitmap having a same structure as the target SN SCG bitmap, the source SN SCG bitmap indicating which features of the list of features of RRC configuration are changed or are being changed by the executed SCG reconfiguration; and during the MN-initiated CPC procedure: based on information regarding a secondary cell group (SCG) reconfiguration for the source SN, compare the information target SN SCG bitmap with the source SN SCG bitmap by executing a logical AND operation, to determine whether the executed SCG reconfiguration requires cancellation or re-initialization of the MN initiated CPC procedure, in case a result of the logical AND operation consists of all zeros, determine to maintain the MN-initiated CPC procedure as prepared, and in case the result of the logical AND operation comprises a non-zero value, cancel or re-initialize the MN-initiated CPC procedure.

2. A processor-implemented method comprising: establishing dual connectivity between a user equipment (UE) and a source master node (source MN) and a source secondary node (source SN);

receiving, by a source master node (source MN) or a source secondary node (source SN), a list of features of radio resource control (RRC) configuration, the list provided preparing, by a target secondary node (target SN) of a conditional handover (CHO) MN-initiated CPC (master node-initiated conditional primary cell of a secondary cell group change) procedure, a target SN secondary cell group (SCG) bitmap, wherein the target SN SCG bitmap indicates, for each feature of a list of features of radio resource control (RRC) configuration, whether a future SCG reconfiguration change in the respective feature requires cancellation or re-initialization of the MN-initiated CPC procedure;

preparing, by a target master node (target MN), a master cell group (MCG) bitmap: receiving, by the source MN, the target SN SCG bitmap and the MCG bitmap;

transmitting, by the source MN to the source SN, an Xn Address Indication signal, the Xn Address Indication signal comprising: the target SN SCG bitmap, and an information element for conditional handover indication set to "coordination-only"; storing, by the source SN, the target SN SCG bitmap, executing, by the source SN, a SCG reconfiguration;

generating, by the source SN, a source SN SCG bitmap having a same structure as the target SN SCG bitmap, the source SN SCG bitmap indicating which features of the list of features of RRC configuration are changed or are being changed by the executed SCG reconfiguration;

when the source SN executes the SCG reconfiguration: comparing, by the source SN, the target SN SCG bitmap with the source SN SCG bitmap by executing a logical AND operation, to determine whether the executed SCG reconfiguration requires cancellation or re-initialization of the MN-initiated CPC procedure in case a result of the logical AND operation comprises a non-zero value, setting, by the source SN, a flag value to "1";

in case the result of the logical AND operation consists of all zeros, setting, by the source SN, the flag value to "0"; transmitting, by the source SN to the source MN, a notification containing the flag value;

determining, by the source MN, in case the flag value is "0", to maintain the MN-initiated CPC procedure as prepared and determining, by the source MN, in case the flag value is "1", to cancel or re-initiate the MN-initiated CPC procedure, during the CHO procedure: based on information regarding a secondary cell group (SCG) reconfiguration for the source SN, comparing, by the source MN or the source SN, the information with the list to determine whether the SCG reconfiguration requires cancellation or re-initialization of the CHO procedure.

\* \* \* \* \*